(12) United States Patent  (10) Patent No.: US 8,525,784 B2
Benenson  (45) Date of Patent: Sep. 3, 2013

(54) INPUT DEVICE FOR USE WITH A DISPLAY SYSTEM

(75) Inventor: Alexander Benenson, Wilsonville, OR (US)

(73) Assignee: Seiko Epson Corporation, Tokyo (JP)

( * ) Notice: Subject to any disclaimer, the term of this patent is extended or adjusted under 35 U.S.C. 154(b) by 584 days.

(21) Appl. No.: 12/708,515

(22) Filed: Feb. 18, 2010

(65) Prior Publication Data

US 2010/0214215 A1    Aug. 26, 2010

Related U.S. Application Data

(60) Provisional application No. 61/154,337, filed on Feb. 20, 2009.

(51) Int. Cl.
*G06F 3/033* (2006.01)

(52) U.S. Cl.
USPC ........... 345/158; 345/156; 345/163; 345/157; 345/179; 353/42; 434/76; 434/314; 178/19.05

(58) Field of Classification Search
USPC ................. 345/156–157, 173, 158, 145, 163, 345/179; 715/700; 348/14.05, 211.99, 113–118; 434/314, 4, 434/76; 353/42, 57; 340/815.6; 178/19.05
See application file for complete search history.

(56) References Cited

U.S. PATENT DOCUMENTS

| | | | | |
|---|---|---|---|---|
| 5,437,014 A * | 7/1995 | Busboom et al. | ............. | 715/759 |
| 5,554,980 A * | 9/1996 | Hashimoto et al. | ........... | 345/158 |
| 5,717,432 A * | 2/1998 | Miwa et al. | ................... | 345/173 |
| 5,825,350 A * | 10/1998 | Case et al. | ..................... | 345/163 |
| 2004/0036679 A1* | 2/2004 | Emerson | ....................... | 345/168 |
| 2005/0179657 A1* | 8/2005 | Russo et al. | .................. | 345/163 |
| 2009/0079944 A1* | 3/2009 | Chih | .............................. | 353/42 |

* cited by examiner

*Primary Examiner* — Lun-Yi Lao
*Assistant Examiner* — Md Saiful A Siddiqui
(74) *Attorney, Agent, or Firm* — Oliff & Berridge, PLC

(57) ABSTRACT

A methods and systems for use of an input device with a display system are disclosed. In an example embodiment, a projection device configured to project a displayed image is provided where the displayed image includes one or more selectable items. The projection system further includes an input device which may be movable in free space and may be configured to point to the selectable items. The input device may be enabled to provide a double-click input to effect one or more changes in a graphical user interface that corresponds with a selection of a particular one of the selectable items at which the input device is pointed. The double click input may be identified such that movement of the input device after initiation of the double-click input may be ignored by the graphical user interface until completion of the double click input.

18 Claims, 3 Drawing Sheets

INPUT DEVICE FOR USE WITH A DISPLAY SYSTEM

CROSS-REFERENCES TO RELATED APPLICATIONS

This application claims the benefit of U.S. Application No. 61/154,337, filed Feb. 20, 2009, the disclosure of which is incorporated herein by reference in its entirety.

BACKGROUND OF THE INVENTION

The present application relates to methods and systems for use of input devices with a display system.

SUMMARY

Multimedia display devices, such as projection devices, have become popular for purposes such as conducting sales demonstrations, business meetings, classroom training, and for use in home theaters. The display devices may be used to project an image onto a surface a distance away from observers and/or users. Various input devices may be integrated with a projector or projection system. In some cases, such as when a projector is coupled with a computing device, such as a personal computer or the like, an input device may be used as a pointing and/or writing device such as a wireless stylus. The pointing device may also function as a wireless mouse-like input device.

In some examples the input device may have one or more buttons, switches or other inputs on, for example its top surface, that function as one or more mouse buttons. In some examples, the input device may also include an optical sensor at, for example, its tip that may "see" a region of the projected image that may, for example, be in line with a central axis of the input device. A user may be able to point the input device at various parts of the projected image, and the input device may be configured to transmit information about the region it is "seeing" back to the projector. This may allow a display, and/or computing environment to determine on-screen coordinates on the area being addressed. In some cases, a cursor may be visible on the display and may be movable in accordance with the location at which the input device is pointed.

The inventor herein has recognized one or more problems with such an environment. For example, unintended motions may be magnified, or may cause an error in addressing the position of the device. In addition, the further the input device is from the projected image, the more motions, for example arc-like hand motions, may be magnified. A possible source for significant unintentional motions may result as a side effect of clicking a button on a handheld input device. Clicking may cause the tip of the input device to dip down, and then bounce back up. This can be especially problematic when double-clicking since a successful double-click may include two clicks which occur very close together in time and space.

In some examples, the input device may be used as a stylus, or a pen to write or mark-up the image, by for example making notations, or sketching, or the like on the displayed image. In such cases a user may sit or stand at a distance from the display and point the input device at the display. A line, for example, may be added to the displayed image as the user moves the location at which the input device is pointed. Further, in some cases, it may be desirable for the user to initiate a change in the display, that may be made with, for example, a double-click input. The input device may include a button and/or other switch which enables a double-click input. In such a case, inadvertent, and/or undesirable, movement of the input device while the user provides the double-click input, may be mitigated by various example embodiments discussed herein.

What is needed is a system including a display, and an input device, wherein the input device is configured to provide input to the system while pointing at various locations of the displayed image. By providing a system to identify a double-click action, improved accuracy in addressing various inputs including double-click inputs.

In an example embodiment, the display system may be any interactive display system or device, and may be, without limitation, a projector, a projection system, an interactive whiteboard, or the like. The system may be included as part of a computing system. The system may have a graphical user interface, and may be coupled with and/or integrated with a projection device configured to project a displayed image. The displayed image may include one or more selectable items included in the graphical user interface. An input device may be movable in free space and may be configured to point to the selectable items. The input device may also be configured to provide a double-click type input to effect one or more changes in the graphical user interface that may correspond with a particular one of the selectable items at which the input device is pointed. As described below, movement of the input device after initiation of the double-click input may be ignored by the graphical user interface. In this way, the system may achieve greater accuracy in recognizing double-click inputs.

Various embodiments may provide a location indicator, for example a cursor, on the display that may be configured to move back to the location at which a double-click input is initiated when the input is registered as a double-click input. In some examples, the location indicator may appear to jump back. In other cases, the location indicator may remain in the location at which the input device is pointed for a predetermined amount of time. The predetermined amount of time may be, for example, until the system determines whether or not a double-click has occurred.

As mentioned, the projection device may be coupled to a computing device configured to provide video and/or image signals to be projected. The computing device may also be configured to run various computer applications. In some cases, it may be useful for a presenter to run one or more of the computer applications while projecting the output of the application(s).

Image data used to form a projected image may be from various sources. As a few examples, the information may be from the projection device itself, from a computing device coupled with the projection device, or from a device coupled with projection device via a network. The image data may be transmitted to the image display device directly or through a network. For example, image data, such as stored image data, including presentations, may be projected through the network onto one or more display devices.

The following is a non-exhaustive list of exemplary image display devices: cathode ray tubes (CRTs), projectors, flat panel liquid crystal displays (LCDs) systems, LED systems, plasma systems, front projection systems, rear projection systems, LCD monitors, etc. Large format display devices may include, but may not be limited to, televisions, front-projection systems, interactive whiteboards, and rear-projections systems. Theses devices may be adapted to display images, including text, graphics, video images, still images, presentations, etc. Such image display devices may be found in education environment and applications, business facilities, conference rooms and other meeting facilities, etc.

Image display devices may be configured to display image data that are stored in a storage device. Storage devices may include but are not limited to computers, laptop computers, personal computers, storage mediums, such as memory cards and other memory devices, cameras, telephones, Smartphones, portable data assistants, etc. The storage devices may be coupled in a wired or wireless configuration, to the image display device for display of the image data.

DETAILED DESCRIPTION OF THE INVENTION

Embodiments may provide a wired, or a wireless network, or a combination of a wired and a wireless network. The network may include a display device, such as a projection device, having a transceiver that may be located inside or outside of the display. The transceiver may enable features within a display, or projection, domain to communicate with one or more interactive, or input, devices. Various embodiments may be scalable in that numerous and varied input devices may be configured to couple with the display. In some cases the input device may be a pen pointer.

Various embodiments may be configured to allow interaction with one or more light patterns produced in projection images. Embodiments may provide for transferring optical pulse information captured by an interactive device to a projection device. The projection device may be configured to display, or project data or video. The display device may use the optical pulse information to determinate the coordinates in the projected image at which the interactive device may be pointing, and/or addressing. For example, the interactive device may be an optical sensor. The optical sensor may be coupled with the display device in various ways including by using wires, wirelessly, or a combination of wired and wireless couplings.

Figure 1:
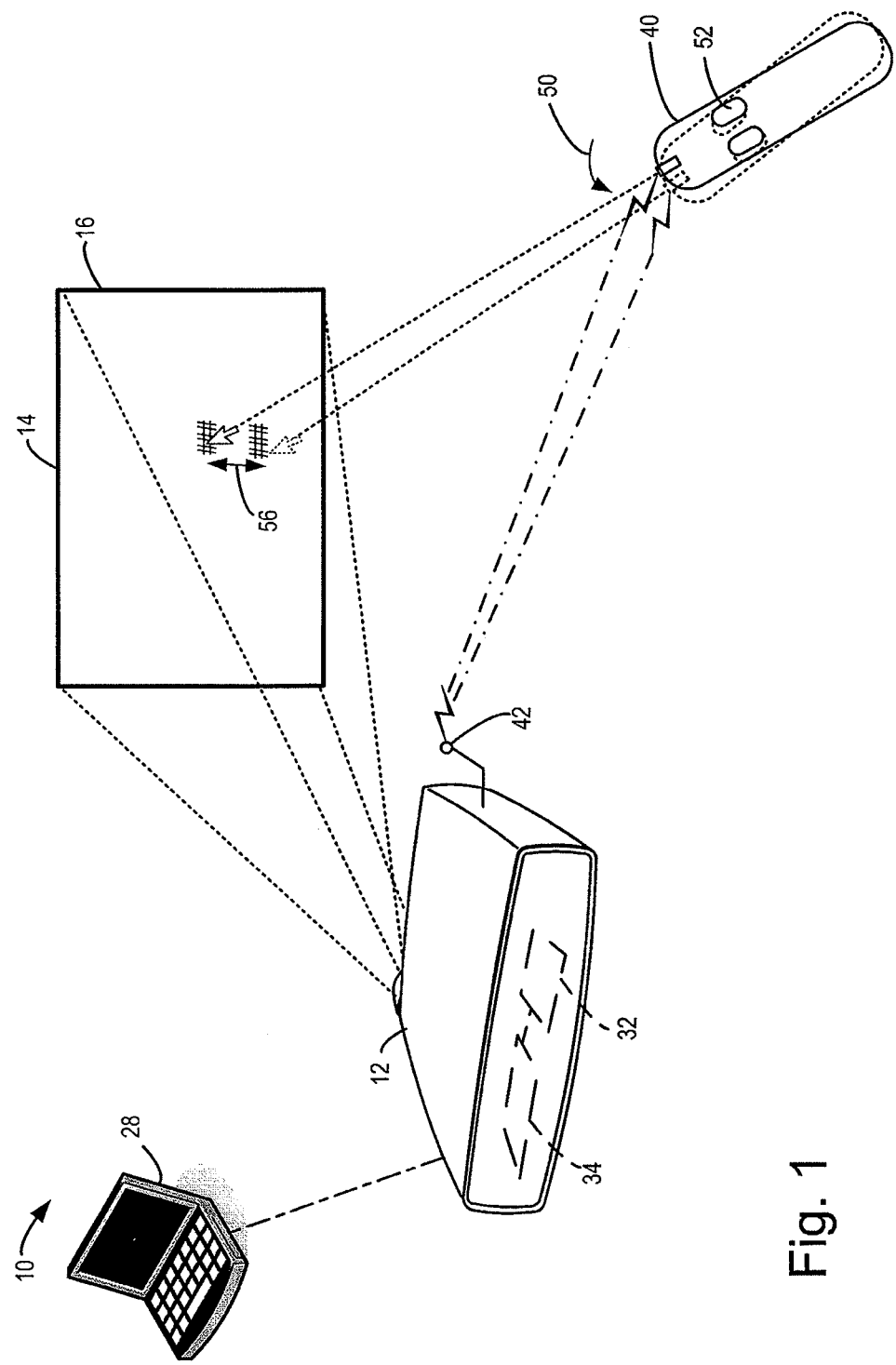
FIG. 1 is a schematic view illustrating various components of an example projection system in accordance with the present disclosure.

FIG. 1 depicts an example embodiment of the present invention. A projection system 10 may include a projection device 12. The projection device 12 may be adapted to project an image 14 onto any suitable display surface 16, including, but not limited to, a screen, a wall, or other viewing surface or area. As used herein, a projection device 12 or image-generating device may include any suitable display device or image projector, including, but not limited to, a digital projector, a liquid crystal display (LCD) projector, a digital light processing projector, etc.

The projection device 12 may include a processor 32 and a memory 34. The processor 32 and the memory 34 may be resident in, or may be coupled with, the projection device 12. Software may be resident in the memory 34, and may be configured to run various applications. The processor 32 may take the form of a central processing unit (CPU), or other suitable controller for controlling operation of the projection device 12. Processor 32 may be configured to manage operation, and\or function, of the projection device 12, and/or applications to run the projection system 10 described herein Memory 34 may include volatile memory and\or non-volatile memory. Non-volatile memory may be utilized to store permanent or semi-permanent data. Such non-volatile memory may be any suitable type of non-volatile memory, including, but not limited to, ROM, PROM, EPROM, EEPROM and Flash memory, and combinations thereof. Volatile memory may be utilized to store temporary data, including images and instructions. Volatile memory may include one or more suitable types of volatile memory, such as SRAM or DRAM.

A display signal source 28 may be coupled to the projection device 12 for providing content to be projected by the projection device 12. The display signal source 28 may be, for example, a computing device such as the laptop computer as illustrated here. The content from the display signal source 28 may be, for example, a presentation, or a display from, for example, a software application. The software application may include a user interface, or a video, or the like. The content may be in the form of one or more digital files. The display signal source 28 may also, or instead, include a processor, and memory, and the like, and other elements configured for the function of the display signal source 28.

The projection system 10 may also include one or more interactive devices operatively coupled for communication with the projection device 12. The one or more interactive devices may be an input device 40 configured to provide one or more signals to the projection device 12 to modify the image, and/or to cause a change in the display 14. The projection device 12 may include a receiver 42 configured to receive wireless signals from the input device 40. In other examples, one or more input devices may be coupled to the projection device, or other display with a wired connection.

A movement 50 of the input device 40 is illustrated with an arrow. The movement 50 may be inadvertent and may be caused by a double-clicking action of a user pressing button 52, for example. The movement 50 may cause a corresponding movement 56 of the location at which the input device is pointed.

Various embodiments may include, or provide a system having a projection device configured to project an image. A graphical user interface may include one or more graphical elements displayed in the image. The graphical user interface may be configured to accept one or more inputs having a minimum duration between an initiation signal and a termination signal. An input device, which may be movable in free space, and configured to be pointed at one of the one or more graphical elements, may be configured to provide the initiation signal and the termination signal to the graphical user interface. The initiation signal may trigger a response from the graphical user interface that may correspond to a selection of a specific one of the one or more graphical elements at which the input device is pointed. The selection may effect a change in the graphical user interface, such as a starting an application, or selecting an item from a pull down list, or the like. Any movement of the input device after receipt of the initiation signal may be ignored by the system when the termination signal is received within a predetermined amount of time from receipt of the initiation signal.

The input device may be configured to provide a double-click type input to effect one or more changes in the graphical user interface that correspond with a double-click selection of a particular one of the selectable items at which the input device is pointed. Any movement of the input device after initiation of the double-click input may be ignored by the graphical user interface until a completion of the double-click input.

The projection system may include a cursor displayed as part of the graphical user interface. The cursor may be configured to indicate where the input device is pointed within the graphical user interface. The cursor may also be movable with the input device. In some cases the cursor may be configured to stay at a location at which the input device was pointed when the double-click entry was initiated. Additionally, or alternatively, the cursor may be configured to move back to the location at which the input device was pointed when the double-click entry was initiated after a preselected amount of time long enough to register the double-click entry.

In some examples, the input device may include at least one button or switch on a central axis thereof configured to be suppressed to provide the double-click entry. The at least one button may be configured "trigger" style on the input device. In some examples, the input device may include at least one button configured to be suppressed once but which may be configured to register the entry as a double-click entry.

Some example embodiments may provide an input device that may include a mechanical stabilizer configured to stabilize the input device at least upon initiation of the double-click input for at least a predetermined duration. The predetermined duration may be equal to, or greater than, an amount of time for the double-click input. Various stabilizers may be used, for example, a gyroscopic stabilizer.

Various example embodiments may provide a method to increase recognition accuracy of certain inputs with one or more input devices provided in conjunction with a display, wherein the display is spaced apart from the input device. Methods may be implemented via the components and systems described above, but alternatively, may be implemented using other suitable components. One example method may include, receiving an initiation signal from the input device indicative of an initiation of an input, registering a start time corresponding with when the initiation signal is received from the input device, registering a first location on a display at which the input device is pointed, at the start time, receiving a termination signal from the input device indicative of a termination of the input, registering an end time corresponding with when the termination signal is received from the input device, and registering the occurrence of the input as a recognized input being inputted at the first location when a difference between the end time and the start time is below a predetermined threshold.

In some examples the display may be configured to display a position marker on the display at a current location at which the input device is pointed. The method may include moving the position marker to the first location upon registering the occurrence of the input as the recognized input.

Another example may provide a method of receiving an input from an input device. The method may include receiving an initiation signal from the input device indicative of an initiation of an input, registering a start time corresponding with when the initiation signal is received from the input device, receiving a termination signal from the input device indicative of a termination of the input, registering an end time corresponding with when the termination signal is received from the input device, and registering the occurrence of the input as a recognized input when a difference between the end time and the start time is below a predetermined threshold.

Registering the occurrence of the input as a recognized input may be registered as having occurred at the start time. In some cases, the method may include registering a start position as a first location on a display at which the input device is pointed when the initiation signal is received, and registering an end position as a second location on the display at which the input device is pointed when the termination signal is received.

Figure 2:
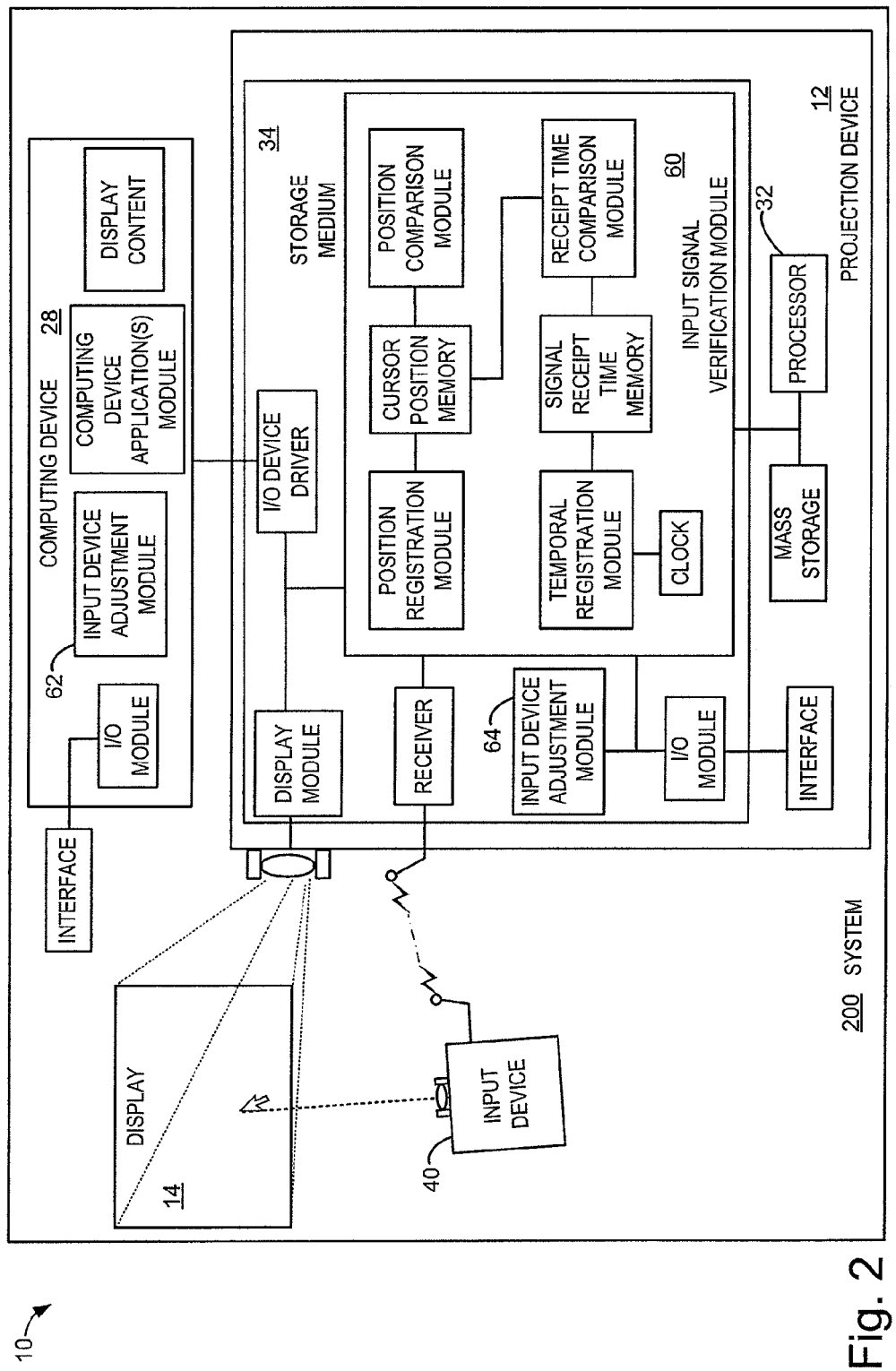
FIG. 2 is schematic view of an example projection system.

FIG. 2 is schematic view of an example projection system 200 in accordance with the present disclosure. The projection system 200 may include a projection device 12 that may include at least one tangible computer-readable storage medium 34 having stored computer-executable instructions. The system 200 may also include a computing device 28 coupled wirelessly, or with a cable, to the projection device 12. Other connections to the computing device 28 are possible, such as a network connection.

Data may be transferred between devices in the system 200 using various communication protocols. Data may flow through the system 200 between the various software entities. In some cases, some or all, of the software entities may be located in the projector, and in other cases some or all, of the software entities may be located on the connected computer 28. Some software entities may be located on the input device 40.

The system 200 may include a projection device 12 configured to project an image. The projected image may include a graphical user interface that may include one or more graphical elements displayed in the image. The graphical user interface may be configured to accept one or more inputs having a minimum duration between receiving an initiation signal and termination signal. An input device may be movable in free space, may be configured to be pointed at one of the one or more graphical elements, and may be configured to provide the initiation signal to the graphical user interface. The initiation signal may trigger a response from the graphical user interface corresponding to a specific one of the one or more graphical elements at which the input device 40 is pointed. Any movement of the input device 40 after receipt of the initiation signal may be ignored by the computer-enabled environment when the termination signal is received within a predetermined amount of time. Movement of the input device being "ignored" may refer to the computer-enabled environment not acting upon, and/or not recognizing movement as being actionable to effect a change in the computer-enabled environment.

The system may include at least one tangible computer-readable storage medium 34 having stored computer-executable instructions, which when executed on a computing device perform steps for detecting when a user is attempting to register a double-click with an input device. All, or parts, of the computer-readable storage medium may be resident in the projection device 12, the computing device 28, or in the input device 40. The example illustrated in FIG. 2 shows an input verification module 60 included in storage medium 34 in the projector 12. The computer implemented steps may include: registering a time of a first click and a location on a display of the first click; registering a time of a second click; and sending a double-click input to the computing device as having occurred at the location of the first click when a duration between the first click and the second click is below a predetermined threshold.

Example systems may include logic that 'corrects' double-clicks. The example logic may be described as follows. Whenever the user double-clicks a button on the input device such as a stylus type input device, and the elapsed time between the two clicks is short enough, and/or the distance between the two clicks is small enough, then before sending the second click to the computer, or otherwise acting on the second click, the logic in the system may move the mouse pointer back to the coordinates it was at when the first click occurred. In this way, the projection system may detect when a user is attempting to double-click, and correct the data before sending it to the computer, to ensure that the computer really 'sees' a double-click at the user's intended initial click location. The logic may be implemented in software or firmware residing on the projector, the input device, or the computer. In various examples the software, or firmware, may be capable of intercepting and altering mouse events before they are passed on to programs running on the computer.

Various example embodiments may include a user interface to adjust various characteristics. FIG. 2 illustrates possible examples to provide this capability. For example an input device adjustment modules 62, or similar, may be resident in the computing device 28, and/or in the projector 12. One, or more, of the example input device adjustment modules 62 may implement any adjustments to the various characteristics received via one or more of the example interfaces illustrated.

One of the characteristics that may be changed is the amount of elapsed time that is used to determine whether two clicks occurred close enough together in time to be considered a double-click. Some example implementations may obtain this value from the computing device's operating system with, or without, user input. Mouse control panel software may allow adjustments to this value.

Another characteristic that may be changed may be the distance that is used to determine whether two clicks occurred close enough together in space to be considered a double-click. In some examples, this value may not be readily available to the user. The logic may use a fixed value determined by, for example, testing. In some examples, the logic could ignore distance when determining whether two clicks are a double-click.

Another characteristic that may be changed may be whether double-clicks are corrected at all. In some examples, a user may be able to selectively turn off the logic and pass mouse motions, and double-click events, to the computer 'as-is'. Distance as a criteria may, or may not, be included.

A user interface to enable changing the characteristics as described may reside on the projector, and may be controlled using a keypad on the projector. Additionally, or alternatively, control may be via a remote control, or through a linked computing device. The adjustments may be facilitated through use of screens included in the display, and/or displayed on the computer. Various embodiments may, or may not, have a user interface. In some cases, a graphical user interface may be provided.

It should be appreciated that different operating systems may be used. For example, the Microsoft WINDOWS operating system may be used, however other operating systems may also be used. Depending on the operating systems, the operating system may only track the mouse pointer position when the mouse point events occur over a preset threshold period of time. Thus, some system may not track mouse pointer motion events which occur between two clicks in a double-click as long as the two clicks are close enough together in time. In some example embodiments, the transmission of pointer motion events may be suspended after the first click is received, until a time window for the second click has passed, or closed.

Figure 3:
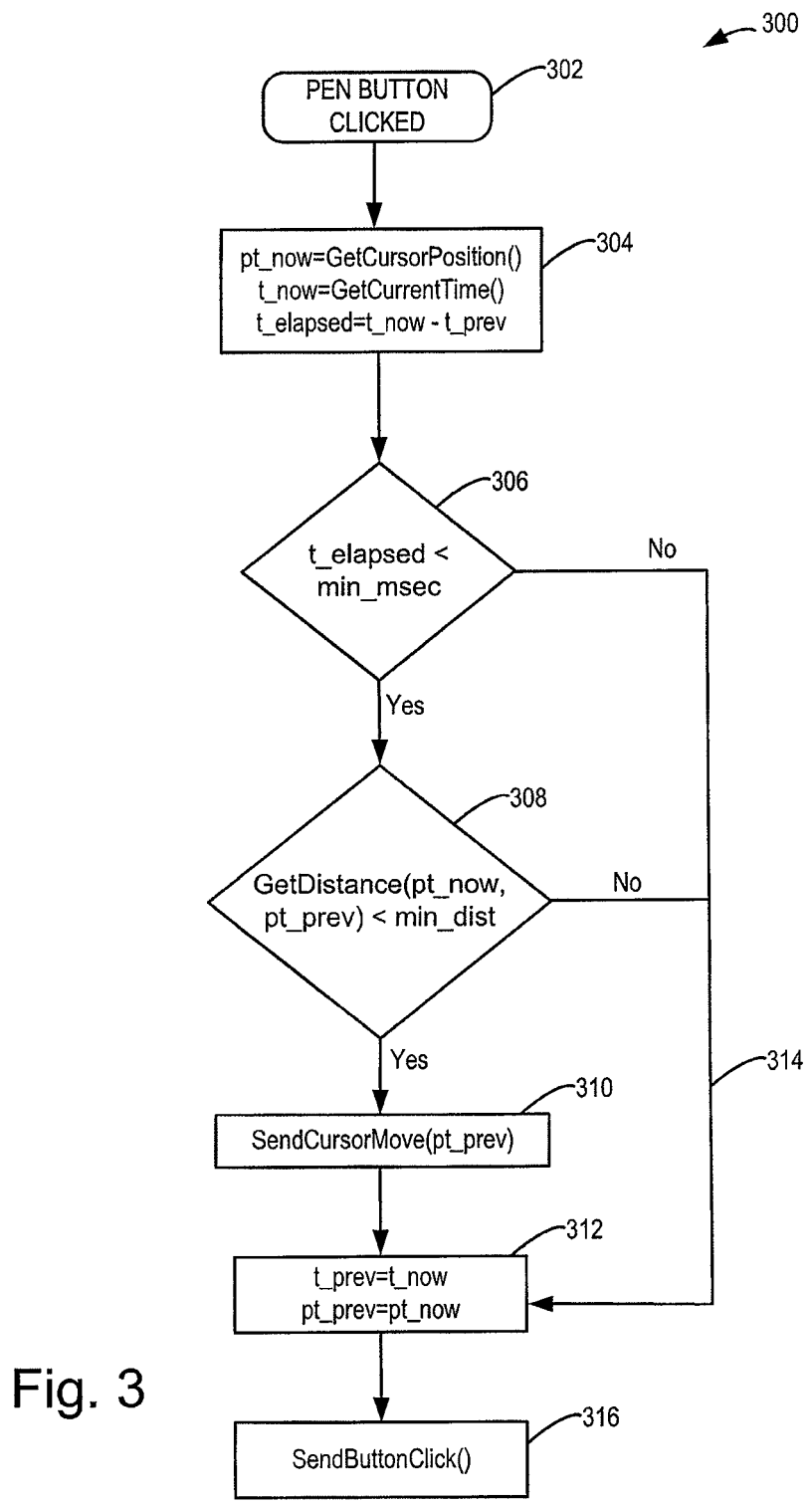
FIG. 3 is a schematic flow diagram illustrating one example configuration method in accordance with the present disclosure.

FIG. 3 is a schematic flow diagram illustrating one example method that may be performed with a configuration of an example system in accordance with the present disclosure. The system may include a pointing device, and a computing device coupled to a projection device configured to receive coordinate data via the display device from the pointing device indicative of a location on a display at which the pointing device is pointed.

The flow diagram illustrates a method 300 that may be implemented to, for example, increase the pointing accuracy of an input device. The method 300 may be implemented via the components and systems described above, but alternatively may be implemented using other suitable components. The flow chart may illustrate logic that may be implemented in software, or firmware. The software, or firmware may be resident in one or more of the input device, the projection device, or the computing device. In some examples, the logic may be configured to intercept, and/or alter, input device events before they are passed on to programs running on the computing device, and/or in some cases, programs running on the projection device.

The flow diagram illustrates, at 302, a pen input device, such as a handheld pen, being clicked. Then, at 304, "GetCurserPosition( )" may return the current computer mouse (input device) coordinates. Also at 304, "GetCurrentTime( )" may return the number of milliseconds that have elapsed since the system initialized.

Decision box, at 306, illustrates that if two clicks are spaced less than "min_msec" apart in time, they could qualify as a double-click. The min_msec value may match the similar value used in the computer's mouse software to detect double-clicks. The min_msec value may be fixed, or adjustable in a user interface.

Decision box, at 308, illustrates "GetDistance( )" may return the distance between two coordinates. In some examples, if two clicks are more than "min_dist" pixels apart they may not qualify as a double-click. In some examples, this "distance test" may be omitted.

At 310, "SendCursorMove( )" may inform the computing device that it should move its mouse cursor to the indicated coordinates. Box 312, illustrates a next step after the cursor is moved to the indicated coordinates in the case of a double-click being properly detected. Arrow 314 indicates an alternative to the next step in the logic flow in the case of no double-click being properly detected, i.e. around box 310 to box 312 without the cursor being moved according the logic in box 310. At 316, "SendButtonClick( )" may inform the computer that the button has been clicked.

It should be appreciated that the above double-click identification and correction may be applied to any suitable stylus, or input device, as used in a receiving input environment, such as, but not limited to, the projection environment described above. Thus, regardless of the projection module or input application, the identification correction of the double-click accuracy can be applied in a variety of environments.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

What is claimed is:

1. A projection system comprising:
a projection device;
a displayed image projected by the projection device, the displayed image including one or more selectable items;
an input device being movable in free space and configured to point to the selectable items, the input device being configured to provide a double-click input to effect one or more changes in a graphical user interface that corresponds with a selection of a particular one of the selectable items at which the input device is pointed, wherein any movement of the input device after initiation on of the double-click input is ignored by the graphical user interface until completion of the double-click input; and
a cursor displayed as part of the graphical user interface and configured to indicate where the input device is pointed within the graphical user interface, the cursor being movable with the input device, wherein the cursor is configured to: (1) stay at a location at which the input device was pointed when the double-click entry was initiated, and (2) move back to the location at which the input device was pointed when the double-click entry was initiated after a preselected amount of time long enough to register the double-click entry.

2. The projection system of claim 1, wherein transmission of any movement events of the input device is suspended after the first click is received until a predetermined amount of time has passed.

3. The projection system of claim 2, wherein the projector has a receiver configured to receive wired signals, or wireless signals from the input device.

4. The projection system of claim 2, wherein the input device is a pen pointer.

5. The projection system of claim 1, wherein the input device includes a mechanical stabilizer configured to stabilize the input device at least upon initiation of the double-click input for at least a predetermined duration, the predetermined duration equal to, or greater than, an amount of time for the double-click input.

6. The projection system of claim 5, wherein the mechanical stabilizer is a gyroscopic stabilizer.

7. The projection system of claim 5, wherein the mechanical stabilizer is an increased weight of the input device.

8. The projection system of claim 1, wherein the input device includes at least one button on a central axis thereof configured to be suppressed to provide the double-click input.

9. The projection system of claim 8, wherein the at least one button is configured trigger style on the input device.

10. The projection system of claim 1, wherein the input device includes at least one button configured to be suppressed once but to register the double-click input.

11. The projection system of claim 1, wherein the computing device is configured to provide image data to the projection device.

12. The projection system of claim 1, wherein the input device includes an optical sensor configured to detect optical pulse information from the projected image indicative of a location within the image substantially corresponding to a location at which the interactive device is pointed.

13. A system comprising:
a projection device configured to project an image;
a graphical user interface including one or more graphical elements displayed in the image, the graphical user interface configured to accept one or more inputs having a minimum duration between receiving an initiation signal and a termination signal;
an input device being movable in free space and configured to point at one of the one or more graphical elements and configured to provide the initiation signal to the graphical user interface, the initiation signal triggering a response from the graphical user interface corresponding to a selection of a specific one of the one or more graphical elements at which the input device is pointed, wherein any movement of the input device after receipt of the initiation signal is ignored by the system when the termination signal is received within a predetermined amount of time; and
a cursor displayed as part of the graphical user interface and configured to indicate where the input device is pointed within the graphical user interface, the cursor being movable with the input device, wherein the cursor is configured to: (1) stay at a location at which the input device was pointed when the double-click entry was initiated, and (2) move back to the location at which the input device was pointed when the double-click entry was initiated after a preselected amount of time long enough to register the double-click entry.

14. A projection system comprising:
a projection device configured to project an image as an interactive display;
an input device operatively coupled for communication with the projection device;
a computing device application module configured to run a computer-enabled application and to receive input;
a processor enabled input verification module configured to-detect when a user is attempting to register a double-click input with the interactive device before sending a double-click input to the computing device application module; and
the input verification module further configured to send the double-click input to the computing device as having occurred at a first location on the display when a temporal duration between a first click and a second click is below a predetermined threshold,
wherein the interactive display input is configured to display a cursor on the display indicative of a location at which the input device is pointed, and the input verification module is further configured to cause the cursor to move to a specific location on the display at which the input device was pointed when the double-click input was initiated regardless of where the input device was pointed when the double-click input was completed.

15. The projection system of claim 14, wherein the input verification module resident in the projection device.

16. The projection system of claim 14, wherein the input verification module resident in the input device.

17. The projection system of claim 14, wherein the input verification module resident in the computing device.

18. The projection system of claim 14, wherein the interactive display input is configured to display a cursor on the display indicative of a location at which the input device is pointed, and wherein the input verification module is further configured to keep the cursor at a specific location on the display at which the input device was pointed when the double-click input was initiated regardless of where the input device was pointed when the double-click input was completed.

* * * * *